United States Patent
Yoon et al.

(10) Patent No.: US 7,471,595 B2
(45) Date of Patent: Dec. 30, 2008

(54) SLIM OPTICAL PICKUP

(75) Inventors: Eung-yeoul Yoon, Suwon-si (KR); Hyung Choi, Seongnam-si (KR); Woong-lin Hwang, Gunpo-si (KR); Jae-ho You, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 630 days.

(21) Appl. No.: 10/960,924

(22) Filed: Oct. 12, 2004

(65) Prior Publication Data

US 2005/0094534 A1   May 5, 2005

(30) Foreign Application Priority Data

Nov. 4, 2003   (KR) .................... 10-2003-0077790

(51) Int. Cl.
*G11B 7/12* (2006.01)
(52) U.S. Cl. .................. 369/44.12; 369/121
(58) Field of Classification Search ......... 369/121–122, 369/44.12
See application file for complete search history.

(56) References Cited

U.S. PATENT DOCUMENTS

| 4,482,986 | A  | * | 11/1984 | Noda et al. .............. 369/44.16 |
| 6,529,454 | B1 | * | 3/2003  | Asoma et al. ............ 369/44.12 |
| 6,717,893 | B1 | * | 4/2004  | Niss et al. ................ 369/44.19 |
| 6,751,370 | B2 | * | 6/2004  | Avakian et al. ............... 385/18 |
| 6,831,882 | B1 | * | 12/2004 | Takashima et al. ....... 369/44.14 |
| 6,847,499 | B2 | * | 1/2005  | Choi et al. ............... 369/44.14 |
| 7,283,439 | B2 |   | 10/2007 | Shimano et al. |
| 2001/0030795 | A1 | * | 10/2001 | Fujii et al. ................... 359/285 |
| 2002/0027836 | A1 | * | 3/2002  | Suzuki et al. ............ 369/13.24 |
| 2002/0041562 | A1 | * | 4/2002  | Redmond et al. ...... 369/112.19 |
| 2002/0057631 | A1 | * | 5/2002  | Raymond et al. ........ 369/44.19 |
| 2003/0103439 | A1 |   | 6/2003  | Horinouchi et al. |
| 2003/0179667 | A1 |   | 9/2003  | Yoshinaka et al. |
| 2004/0170110 | A1 | * | 9/2004  | Yee .............................. 369/121 |

FOREIGN PATENT DOCUMENTS

| JP | 6-76340     | 3/1994 |
| JP | 2000-4067   | 1/2000 |
| JP | 2001-14720  | 1/2001 |
| JP | 2003-141765 | 5/2003 |

(Continued)

OTHER PUBLICATIONS

Machine translation of JP 2001-014720.*

*Primary Examiner*—Joseph H. Feild
*Assistant Examiner*—Nathan Danielsen
(74) *Attorney, Agent, or Firm*—Sughrue Mion, PLLC (57) ABSTRACT

A slim optical pickup in which a leaf spring is combined with an upper surface of a semiconductor substrate, which is a silicon optical bench (SiOB) monolithically manufactured with a photodetector. The slim optical pickup has a substrate including a light source for generating a light beam, an optical element to irradiate light to an optical disc, a photodetector for receiving a light beam reflected by the optical disc, and a plurality of first bonding pads; a heat sink attached to the surface of the substrate; and a supporting means having a plurality of second bonding pads formed on an inner side of an array of the plurality of the first bonding pads on the substrate.

20 Claims, 6 Drawing Sheets

FOREIGN PATENT DOCUMENTS

| | | |
|---|---|---|
| JP | 2003-168239 | 6/2003 |
| JP | 2003-523036 | 7/2003 |
| JP | 2003-248950 | 9/2003 |
| WO | 01/43126 A2 | 6/2001 |
| WO | WO 01/43126 A2 | 6/2001 |
| WO | 02/21520 A1 | 3/2002 |
| WO | WO 02/29796 A2 | 4/2002 |

* cited by examiner

SLIM OPTICAL PICKUP

BACKGROUND OF THE INVENTION

This application claims the priority of Korean Patent Application No. 2003-77790, filed on Nov. 4, 2003, in the Korean Intellectual Property Office, the disclosure of which is incorporated herein in its entirety by reference.

1. Field of the Invention

The present invention relates to a slim optical pickup, and more particularly, to a slim optical pickup in which a leaf spring is combined with an upper surface of a semiconductor substrate. The semiconductor substrate is a silicon optical bench (SiOB) monolithically manufactured with a photodetector.

2. Description of the Related Art

Recently, the use of mobile information devices, such as personal digital assistants (PDA), mobile phones, digital cameras, and camcorders has increased rapidly. To record and reproduce data to and from a mobile information device, an optical pickup device is required. To apply an optical pickup device to the mobile information device, research on the miniaturization and slimness of the optical pickup device is being actively conducted.

Figure 1:
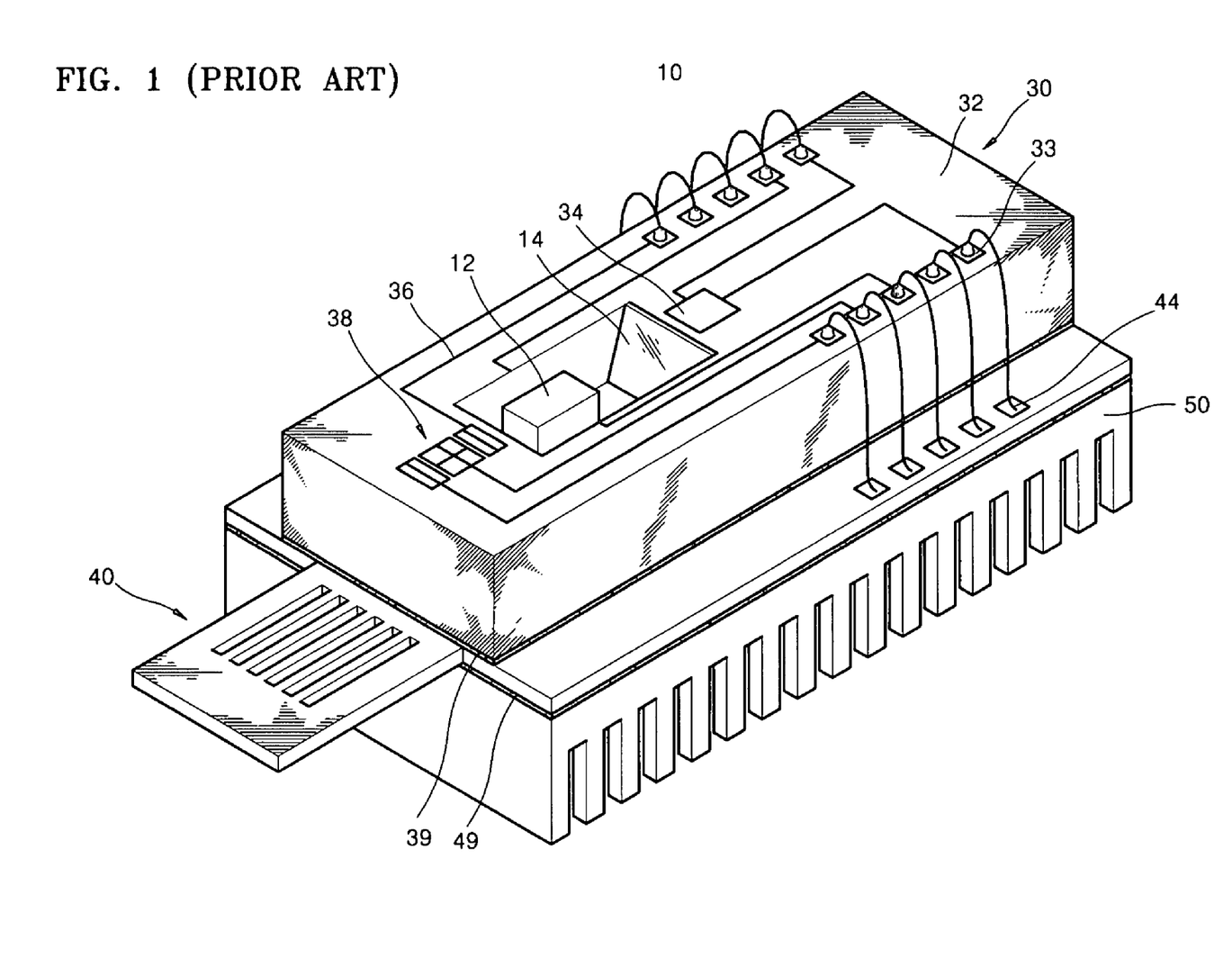
FIG. 1 is a perspective view illustrating a combined SiOB and leaf spring, in which a light source and optical devices are integrated, for use in a conventional slim optical pickup.
Figure 2:
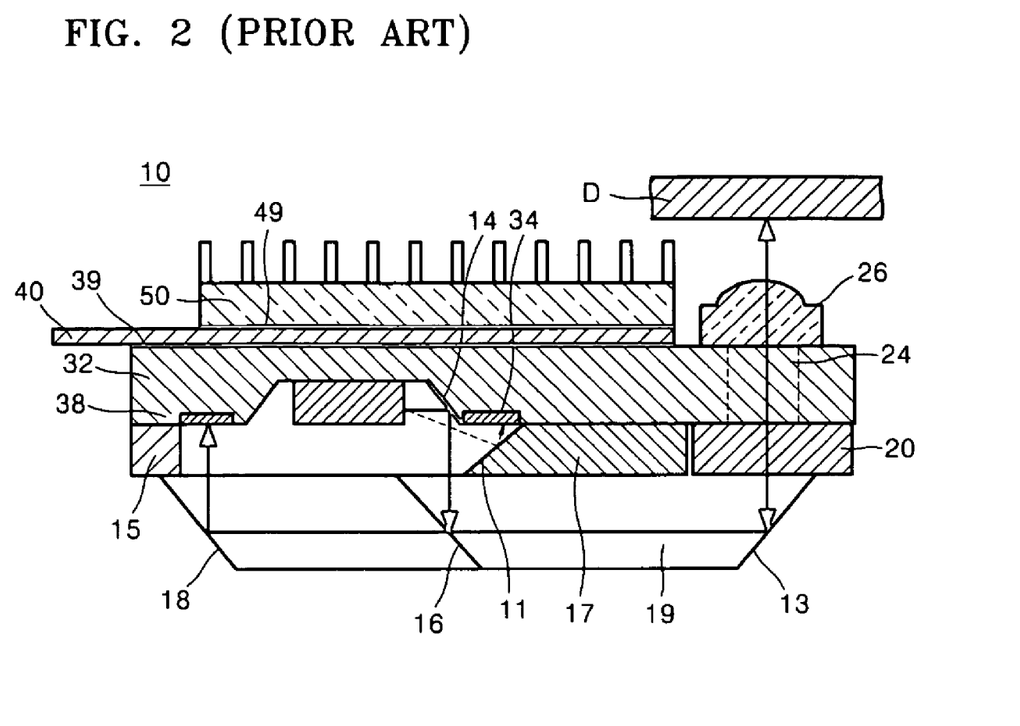
FIG. 2 is a cross-sectional view illustrating a conventional slim optical pickup to which the SiOB and the leaf spring of FIG. 1 are applied.

FIG. 1 is a perspective view illustrating a combined SiOB and leaf spring, in which a light source and optical devices are integrated, for use in a conventional slim optical pickup. FIG. 2 is a cross-sectional view illustrating a conventional slim optical pickup to which the silicon optical bench and the leaf spring of FIG. 1 are applied.

Referring to FIGS. 1 and 2, a slim optical pickup 10 comprises a silicon optical bench (SiOB) 30 in which a light source 12, such as a laser diode, a monitoring photodetector 34, a sloped mirror 14, and a photodetector 38 are included; a polarized light beam splitter 16; a prism 19 which includes first and second reflection surfaces 13 and 18; spacers 15 and 17 disposed between main substrate 32 and beam splitting 16/prism 19; a hologram optical element (HOE) 20; an objective lens 26 attached to a backside of a predetermined part of a SiOB 30 to face the HOE 20; aperture 24 in main substrate 32; a leaf spring 40 attached to a backside of the SiOB 30; and a heat sink 50 disposed on a surface of the leaf spring 40. Wiring 36 electrically connects photodetector 38 to a bonding pad 33. In FIG. 2, 11 corresponds to monitoring mirror 111 described below.

Figure 3:
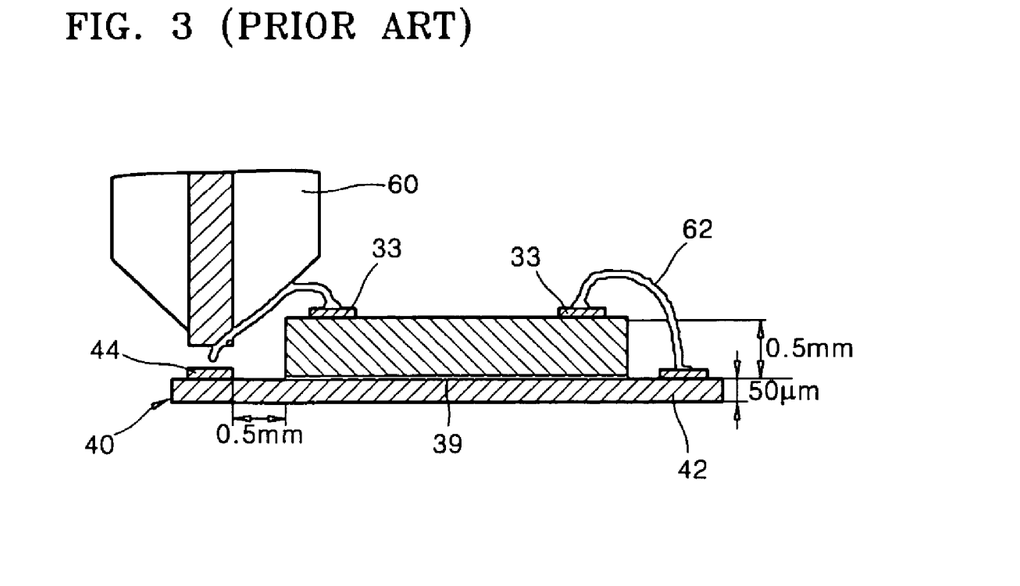
FIG. 3 is a cross-sectional view illustrating a method of electrically connecting a semiconductor substrate to the leaf spring when assembling a conventional slim optical pickup.

FIG. 3 is a cross-sectional view illustrating a method of electrically connecting a semiconductor substrate to a leaf spring when assembling a conventional slim optical pickup.

Referring to FIG. 3, the conventional slim optical pickup 10 has a structure of combining the leaf spring 40 on the back surface of the SiOB 30. In this conventional structure, when wire bonding wire 62 from a bonding pad 33 of the SiOB 30 to a bonding pad 44 formed on the leaf spring 40, a gap between a side surface of the SiOB 30 and the bonding pad 44 of the leaf spring 40 must be maintained to at least 0.5 mm due to a thickness of a capillary of a wire bonder 60.

In this case, a space with a width equal to the width of the bonding pad, plus 0.5 mm on each side of the SiOB 30, is required. Accordingly, there is a drawback in that the width of the leaf spring 40 has to be increased due to the protruded portion corresponding to the space of the leaf spring 40 which is equal in width to the bonding pad plus 0.5 mm on each side.

As a result, there is a heavy load on a motor due to the weight of the head, thereby increasing the power consumption of the motor and increasing seeking time.

In a slim optical pickup, most of the heat is generated from a light source 12 composed of a laser diode. Therefore, it has been known that it is effective to attach a heat sink 50 on a back side of the SiOB 30 since the heat generated is transmitted through a main substrate 32, which is formed of silicon.

However, since the heat generated from the light source 12 finally reaches the heat sink 50 after sequentially passing through the main substrate 32 of the SIOB 30, an adhesive 39 bonding the main substrate 32 to the leaf spring 40, the leaf spring 40, and an adhesive 49 bonding the leaf spring 40 to the heat sink 50, this structure has lower heat transfer efficiency than a structure in which the heat sink is attached to the back side of the SiOB 30. Therefore, there is a problem in that heat cannot be dissipated effectively.

SUMMARY OF THE INVENTION

The present invention provides a slim optical pickup that can dissipate heat efficiently.

The present invention also provides a slim optical pickup having a reduced size.

The present invention also provides a slim optical pickup having a structure in which a SiOB can be assembled to a leaf spring using a ball grid array (BGA) method.

According to an aspect of the present invention, a slim optical pickup is provided, comprising a substrate including a light source for generating light, an optical element for irradiating light to an optical disc, a photodetector for receiving light beams reflected by the optical disc, and a plurality of first bonding pads; a heat sink attached to a surface of the substrate; and a supporting means having a plurality of second bonding pads formed on an inner side of an array of the plurality of the first bonding pads on the substrate, facing the heat sink interposing the substrate.

According to another aspect of the present invention, an optical pickup for recording and reproducing information to and from an optical disc is provided, comprising a substrate including a light source for generating light, an optical element for irradiating light to the optical disc, a photodetector for receiving light beams reflected by the optical disc, and a plurality of bonding pads; a heat sink attached to a surface of the substrate; and a supporting means having a plurality of second bonding pads formed to match an array of the plurality of the first bonding pads on the substrate.

Thus, space that previously had to be reserved for extending a width of a leaf spring for conventional wire bonding can be reduced. This is because the space in a slim optical pick-up of the invention can be formed within an array of the bonding pads of the SiOB, thereby enabling fabrication of a miniaturized slim optical pickup.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which embodiments of the invention are shown. However, the present invention should not be construed as being limited thereto. Like reference numerals refer to like elements throughout the drawings.

Figure 4:
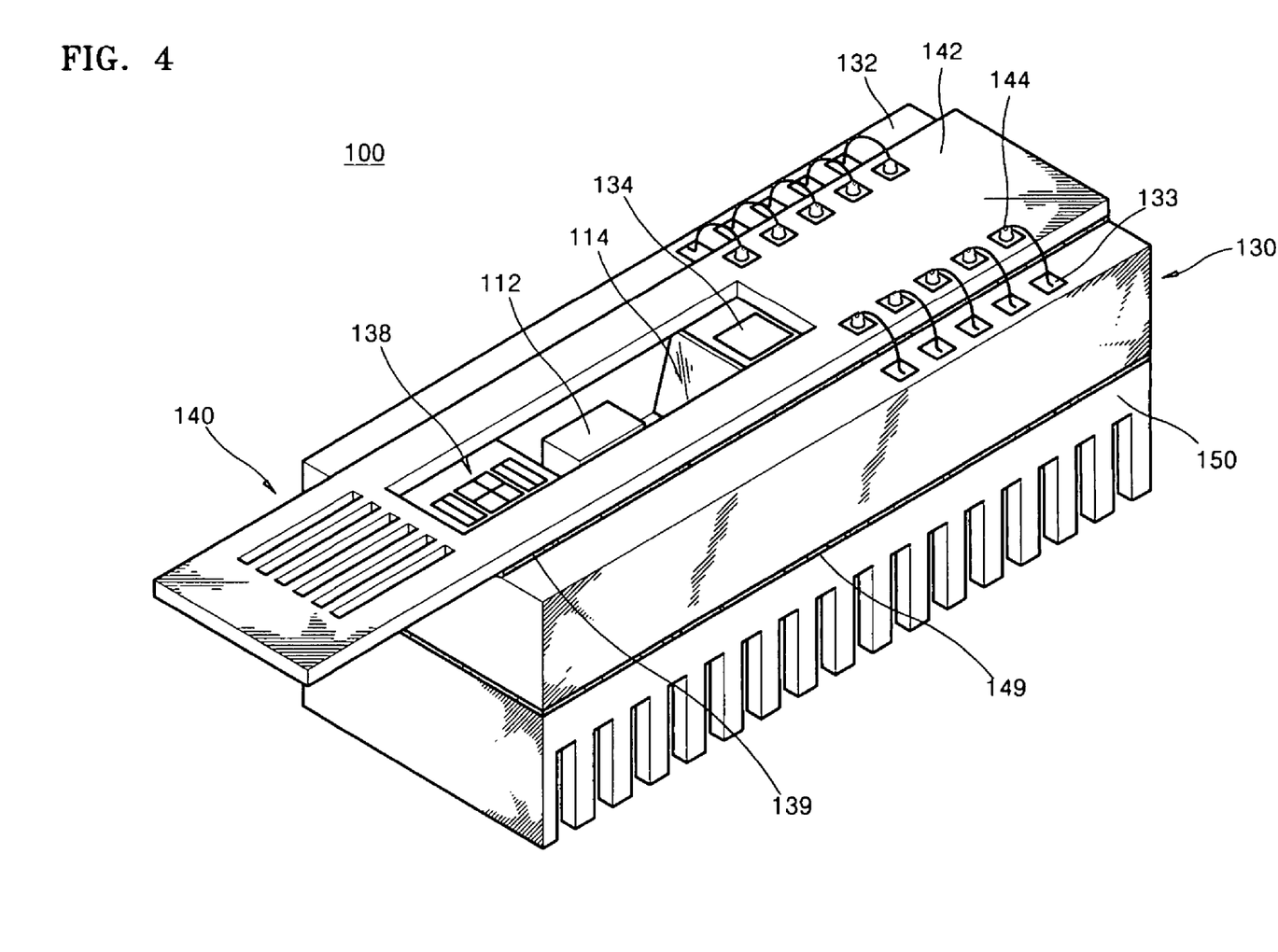
FIG. 4 is a perspective view of a combined SiOB and a leaf spring, in which a light source and optical devices are integrated, for use in a slim optical pickup according to an embodiment of the present invention.

FIG. 4 is a perspective view of a combined silicon optical bench, in which a light source and optical devices are integrated to a leaf spring for use in a slim optical pickup according to an embodiment of the present invention.

FIG. 4 shows a slim optical pickup 100 in which a SiOB 130 (including a light source 112, an eight-partitioned photodetector 138, a slope mirror 114, and a monitoring photodetector 134) and a leaf spring 140 (combined to a front surface of the SiOB 130) are electrically connected.

To increase the bonding force between the leaf spring 140 and a main body of the SiOB 130, an adhesive 139 is applied on a predetermined surface of the leaf spring 140 except the plurality of bonding pads 144. Further, the adhesive is hardened after assembling the leaf spring 140 and the SiOB 130 by wire bonding.

Figure 5:
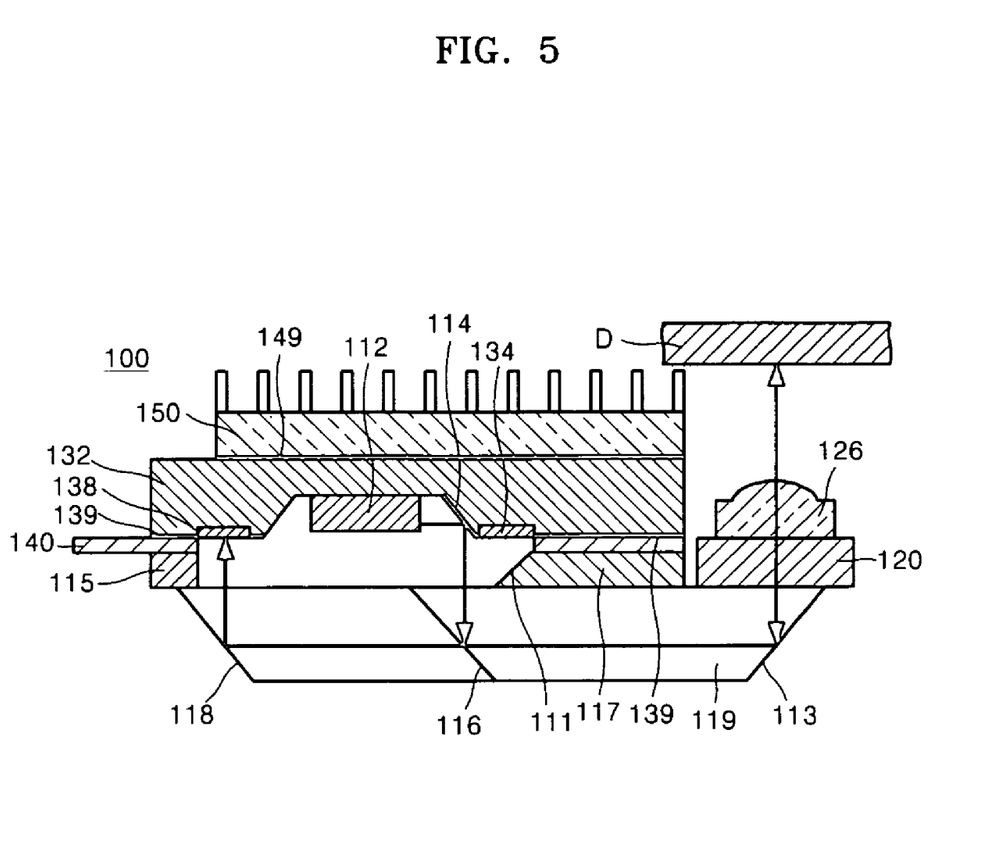
FIG. 5 is a cross-sectional view of a slim optical pickup according to an embodiment of the present invention employing the SiOB and the leaf spring of FIG. 4.

FIG. 5 is a cross-sectional view of a slim optical pickup, according to an embodiment of the present invention, to which the silicon optical bench and the leaf spring of FIG. 4 are applied.

Referring to FIGS. 4 and 5, the slim optical pickup 100 comprises the SiOB 130, the leaf spring 140, a heat sink 150, a HOE 120, an objective lens 126, and a prism 119. The silicon optical bench 130 includes a light source 112, the eight-partitioned photodetector 138, the slope mirror 114, the monitoring photodetector 134, and a plurality of bonding pads 133. The leaf spring 140 includes a leaf spring main body 142 and the bonding pads 144 formed on the leaf spring main body 142. Adhesive 149 bonds silicon optical bench 130 to the heat sink 150.

Though it is not shown in the drawing, a plurality of conductive patterns are formed on the leaf spring 140 and electrically connected to an actuator externally connected to the leaf spring 140 and to other components that constitute the optical pickup assembly.

According to an embodiment of the present invention, the SiOB 130 is formed of silicon, and a groove is formed on the SiOB 130. A light source 112 is flip-chip bonded on a bottom surface of the groove. Mirrors 114 having a 45° slope are disposed on left and right side surfaces of the groove. The bottom surface for mounting the light source 112 and the sloped mirror 114 are formed by dry etching and wet etching the main substrate 132 which is formed of a silicon (Si) wafer having a crystal face of {100} plane tilted at approximately 9.74°. As a result, the silicon forming the sloped mirror 114 has a crystal face of {111} plane. Also, the eight-partitioned photodetector 138 and the monitoring photodetector 134 are disposed on the main substrate 132 of the SiOB 130.

Here, wirings for the light source 112 formed of a laser diode and the photodetectors 134 and 138 are not shown in the drawing, but they are electrically connected to the bonding pads 133 formed on the SiOB 130. According to an embodiment of the present invention, the leaf spring main body 142 of the leaf spring 140 is preferably formed of stainless steel such as SUS304CSPH. Also, the leaf spring 140 and the motor are used for controlling a head of the slim optical pickup 100. An aspect of the present invention is that the leaf spring 140 is disposed on an upper surface of the SiOB 130, that is, the same surface on which the photodetectors 134 and 138 are disposed.

The bonding pads 144 are formed on an upper surface of the leaf spring main body 142. The bonding pads 144 are electrically connected to the bonding pads 133 formed on the SiOB 130 by wire bonding. Such connected wirings are electrically connected to external devices along wirings (not shown) formed on the leaf spring 140.

According to an embodiment of the present invention, the leaf spring 140 has an opening through which the eight-partitioned photodetector 138 can receive light beams generated from the light source 112 and reflected by the optical disc.

Referring to FIG. 5, an operation principle of the present invention will next be described.

A beam generated from a light source 112 enters into a polarized beam splitter 116 of a prism element 119 after being totally reflected by the mirror 114 in an orthogonal direction to the substrate main body 132. The polarized beam splitter 116 reflects a light beam polarized in a first direction (hereafter, "first polarized light beam"), but transmits a light beam polarized in a second direction (hereafter, "second polarized light beam"). Thus, the first polarized light beam is reflected by the polarized beam splitter 116 and enters HOE 120 after being reflected by a first reflection face 113.

On the other hand, that portion of the light beam having a large radiation angle such that it falls outside of the area of slope mirror 114 is reflected by monitoring mirror 111 disposed in front of the monitoring photodetector 134. The light reflected by the monitoring mirror 111 enters the monitoring photodetector 134. The light received by the monitoring photodetector 134 is used for monitoring the amount of light generated from the light source 112.

The first polarized light beam which has entered into HOE 120 enters into an objective lens 126 after passing through HOE 120. A λ/4 plate (quarter wave plate; QWP) (not shown) is further disposed on a light path between the polarized beam splitter 116 and an optical disc D. The λ/4 plate delays a phase of either vertically polarized or horizontally polarized incident light by as much as λ/4, and additionally delays a phase of a first polarized light beam passing through the objective lens 126 after being reflected by the optical disc D by as much as λ/4, thereby delaying a phase of the first polarized light beam by as much as λ/2. That is, after passing through the λ/4 plate twice, the first polarized light beam is rotated 90° with respect to the other polarized light beam (here λ is a wavelength of incident light).

The objective lens 126 focuses the incident light beam on the optical disc D. The focused light beam is reflected by the optical disc D and re-enters HOE 120 after passing through the objective lens 126.

The HOE 120 generates an aberration in the light beam reflected by the optical disc D. Accordingly, the eight-partitioned photodetector 138 can detect a focusing error, a tracking error, or an optical information signal recorded on a recording surface of the optical disc D. That is, the light beam reflected by the optical disc D is divided into $0^{th}$ order or ±1th order by the HOE 120, and the divided light beams are reflected by the first reflection face 113.

The light beam reflected by the first reflection face 113 enters the polarized beam splitter 116 passing through the $\lambda/4$ plate again. At this time, the phase of the light beam that has passed through the $\lambda/4$ plate twice is delayed by as much as $\lambda/2$, and then the light beam is transformed to the second polarized light beam orthogonal to the first polarized light beam. The second polarized light beam is incident to a second reflection face 118 after passing through the polarized beam splitter 116.

The second reflection face 118 reflects the incident light beam to the eight-partitioned photodetector 138. The eight-partitioned photodetector 138 converts the light signal that has been received into an electrical signal. A focusing error, a tracking error, or a tilt error of the optical disc D can be detected using the electrical signal, so that recording and the servo can be controlled. Therefore, the operations of reproducing information stored on the optical disc D can be performed.

In this embodiment, the first and second reflection surfaces 113 and 118 and polarized beam splitter 116 are called a polarizing device. Spacer 117 having monitoring mirror 111 is disposed between substrate 132 and the polarizing device. Spacer 115 is also disposed between substrate 132 and the polarizing device. In the present invention, the eight-partitioned photodetector 138 is employed for controlling the servo and recording and reproducing information stored on the optical disc D by detecting a focusing error, a tracking error, and a tilt error of the optical disc D. However, a variety of different arrangements of photodetectors can be used for the same or similar purpose.

Also, the present embodiment has been described with reference to a structure where the monitoring photodetector 134 is disposed in front of the monitoring mirror 111. However, the structure can be modified to one in which a semi-transparent mirror is used as the sloped mirror 114 and the photodetector can be embedded on a back side of the sloped mirror 114.

Figure 6:
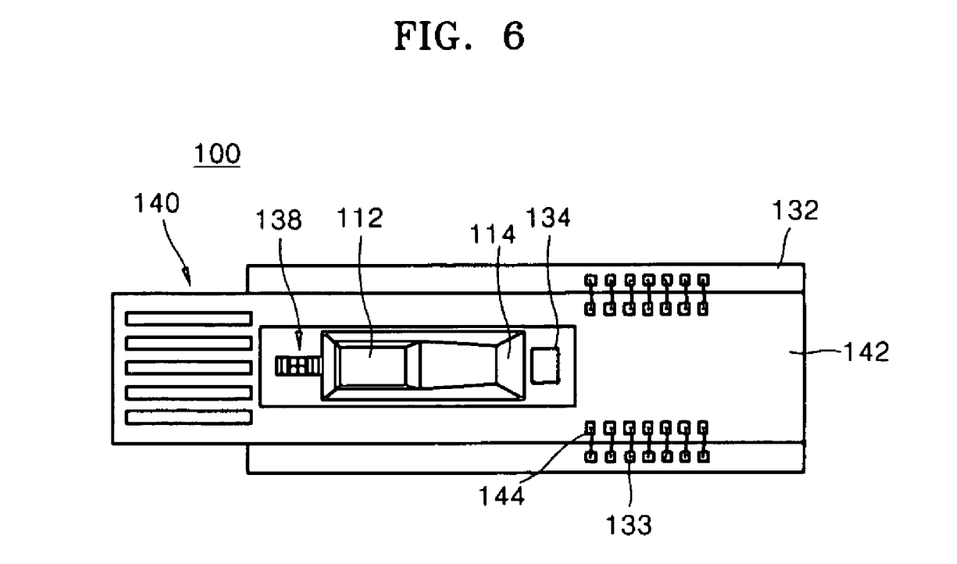
FIG. 6 is a plan view of bonding pads and electrical wiring for wire bonding for electrically connecting a SiOB and a leaf spring according to an embodiment of the present invention.

FIG. 6 is a plan view of bonding pads and electrical wiring for wire bonding for electrically connecting a SiOB and a leaf spring according to an embodiment of the present invention.

Referring to FIG. 6, by forming the leaf spring 140 on an opposite side of the substrate main body 132 of the SiOB 130 on which the heat sink 150 is disposed, the bonding pads 144 formed on the leaf spring 140 can be located at an inner side of an array of the bonding pads 133 formed on the substrate main body 132.

Accordingly, a width of the leaf spring 140 in the present embodiment is significantly reduced compared to a width of a conventional leaf spring for wire bonding.

Figure 7:
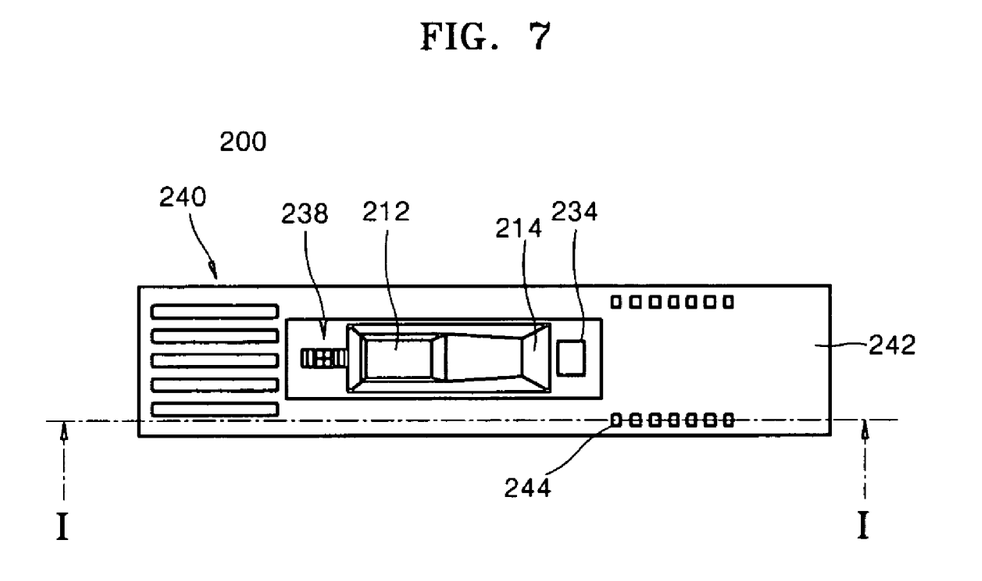
FIG. 7 is a plan view of bonding pads and electrical wiring for assembling a silicon optical bench and a leaf spring using a BGA method according to an embodiment of the present invention.

FIG. 7 is a plan view of bonding pads and electrical wiring for the assembly of a SiOB and a leaf spring using a BGA method according to an embodiment of the present invention.

Figure 8:
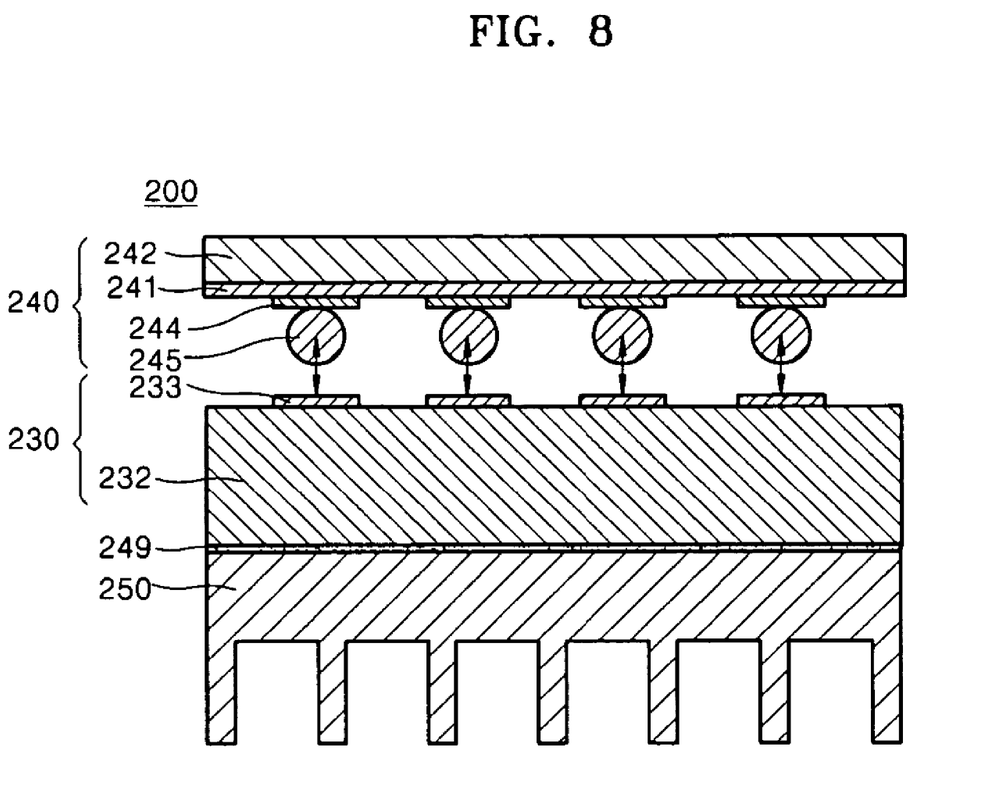
FIG. 8 is a cross-sectional view for describing bonding pads and ball grids for assembling using the BGA method in FIG. 7.

Referring to FIG. 7 and FIG. 8, according to an embodiment of the present invention, by forming a leaf spring 240 on an opposite side of a substrate main body 232 of a SiOB 230 on which a heat sink 250 is disposed via adhesive 249, a plurality of bonding pads 244 formed on the leaf spring 240 can be located at a corresponding location to an array of bonding pads 233 formed on the substrate main body 232. This configuration allows for the assembly of the SiOB 230 and the leaf spring 240 using a BGA method, which cannot be used in a conventional slim optical pickup structure.

That is, if the slim optical pickup 200 is structured such that the leaf spring 240 is attached to a back side of the SiOB 230, it is technically difficult to form bonding pads by making through holes from a front surface to a back surface of the SiOB 230 for connecting the laser diode as the light source, the eight-partitioned photodetector 238, and the monitoring detector 234 formed on the front surface of the SiOB 230 to external electric signals.

Therefore, to electrically connect the SiOB 230 to the leaf spring 240 using the BGA method, it is desirable to form the bonding pads 233 on the front surface of the SiOB 230 on which the laser diode and the photodetector are formed.

Also, the leaf spring 240 includes an opening through which the eight-partitioned photodetector 238 receives a light beam generated from a light source 212 and is reflected by an optical disc D. In FIG. 7, 214 corresponds to slope mirror 114.

FIG. 8 is a cross-sectional view illustrating bonding pads and ball grids for assembly using the BGA method in FIG. 7.

Referring to FIG. 8, the second embodiment of the present invention is identical to the first embodiment of the present invention in function and operation except for the leaf spring. However, to assemble the SiOB 230 and the leaf spring 240 according to the BGA method, the leaf spring 240 is structured as follows.

After forming an insulating film 241 on a main body 242 of the leaf spring 240, the bonding pads 244 having the same shape and arrangement corresponding to those of the bonding pads 233 formed on the main substrate 232 of the SiOB 230 are formed on the insulating film 241. Afterward, a plurality of solder balls 245 are formed on the bonding pads 244 which in turn are formed on the leaf spring 240. Next, the leaf spring 240 is mounted on the SiOB 230 so that the solder balls 245 can be aligned to the bonding pads 233 formed on the main substrate 232 of the SiOB 230.

Further, to increase the bonding force between the leaf spring 240 and the main substrate 232 of the SiOB 230, the adhesive is applied to a predetermined portion of a contacting surface between the leaf spring 240 and the SiOB 230 except the bonding pads 233 and 244. Then, the adhesive is hardened after assembling the leaf spring 240 and the SiOB 230.

Next, by heat treating the main substrate 232 of the SiOB 230, on which the leaf spring 240 is attached, at a predetermined temperature, the leaf spring 240 and the SiOB 230 are electrically connected by melting the solder balls 245 formed on the plurality of the bonding pads 244 of the leaf spring 240.

As described above, according to the first embodiment of the present invention, the space that previously had to be reserved for extending the width of the leaf spring for conventional wire bonding can be reduced. This is because the space can be formed within an array of the bonding pads of the SiOB.

According to the second embodiment of the present invention, by forming a leaf spring on an opposite side of the heat sink attached on a surface of the main substrate of the SiOB, the location of a plurality of bonding pads formed on the leaf spring can be aligned corresponding to the plurality of bonding pads formed on the main body of the SiOB. This structure allows for implementation of the BGA method, which cannot be used in a conventional slim optical pickup, for assembly of the SiOB and the leaf spring.

Also, according to an embodiment of the present invention, since the main body of the SiOB can be in direct contact with the heat sink without the leaf spring interposed therebetween, heat generated at the light source can be effectively transmitted to the heat sink.

Therefore, according to an embodiment of the present invention, since the SiOB can be in direct contact with the heat sink, a characteristic of a laser diode that constitutes the light source can be maintained at a optimum condition. Also, since the heat generated at the heat source is not transmitted to the leaf spring, malfunctions of the leaf spring due to thermal expansion of the spring can be prevented.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A slim optical pickup for recording and reproducing data to and from an optical disc, the slim optical pickup comprising:
    a substrate including a light source that generates light, an optical device that irradiates light onto the optical disc, a photodetector that receives a light beam reflected by the optical disc, and a plurality of first bonding pads;
    a heat sink attached to a surface of the substrate; and
    a supporting unit that includes a plurality of second bonding pads, wherein the supporting unit and the light source are disposed on an opposite surface of the substrate to which the heat sink is attached, said supporting unit having an opening through which the light source and photodetector are exposed.

2. The slim optical pickup of claim 1, wherein the second bonding pads formed on the supporting unit are located at an inner side of the first bonding pads formed on the substrate.

3. The slim optical pickup of claim 2, wherein the second bonding pads formed on the supporting unit are electrically connected to the first bonding pads formed on the substrate by wire bonding.

4. The slim optical pickup of claim 1, wherein the substrate is formed of silicon having a {100} plane.

5. The slim optical pickup of claim 4, wherein the optical device formed on the substrate is a slope minor formed of silicon having a {111} plane.

6. The slim optical pickup of claim 5, wherein the photodetector includes an eight-partitioned photodetector and a monitoring photodetector.

7. The slim optical pickup of claim 6, further comprising:
    a polarizing device disposed facing the photodetector, said polarizing device including first and second reflection surfaces and a polarized beam splitter;
    a spacer disposed between the substrate and the polarizing device;
    a hologram optical element; and
    an objective lens.

8. The slim optical pickup of claim 7, wherein the hologram optical element is formed on said polarizing device.

9. The slim optical pickup of claim 8, further comprising a $\lambda/4$ plate arranged between the polarized beam splitter and the optical disc, wherein $\lambda$ is a wavelength of incident light.

10. The slim optical pickup of claim 9, wherein the supporting means comprises a leaf spring.

11. The slim optical pickup of claim 10, wherein the leaf spring includes an opening through which the photodetector can receive a light beam generated from the light source and reflected by the optical disc.

12. The slim optical pickup of claim 11, wherein the spacer further includes a monitoring minor to reflect light generated from the light source having a radiation angle greater than that of light incident to the slope minor towards the monitoring photodetector.

13. The slim optical pickup of claim 12, wherein the amount of light received by the monitoring photodetector is converted to an electrical signal for controlling the intensity of the light source.

14. The slim optical pickup of claim 1, wherein the heat sink is located in a direction toward the optical disc.

15. The slim optical pickup of claim 1, wherein the supporting unit has a structure on which the plurality of second bonding pads are formed to match the plurality of first bonding pads formed on the substrate.

16. The slim optical pickup of claim 15, wherein the supporting unit includes a leaf spring, an insulating film formed on the leaf spring, and the plurality of second bonding pads formed on the insulating film.

17. The slim optical pickup of claim 16, wherein the second bonding pads formed on the supporting unit are electrically connected to the first bonding pads formed on the substrate by a ball grid array method.

18. The slim optical pickup of claim 16, wherein an adhesive is applied to a predetermined portion of a contact surface between the substrate and the leaf spring, except for the first bonding pads, to thereby bond the substrate and the leaf spring.

19. The slim optical pickup of claim 18, wherein the leaf spring is formed of stainless steel.

20. The slim optical pickup of claim 1, wherein the supporting unit has an opening through which the photodetector receives a light beam generated from the light source and reflected by the optical disc, and the second bonding pads formed on the supporting unit are formed on regions in which the opening is not formed.

* * * * *